US010194021B2

(12) United States Patent
Zhu et al.

(10) Patent No.: US 10,194,021 B2
(45) Date of Patent: Jan. 29, 2019

(54) METHOD, MEDIUM FOR OBTAINING CALL RECORDS OF MOBILE TERMINAL, AND MOBILE TERMINAL

(71) Applicant: Beijing Xiaomi Mobile Software Co., Ltd., Haidan District, Beijing (CN)

(72) Inventors: Ruixian Zhu, Beijing (CN); Shuo Wang, Beijing (CN); Long Pan, Beijing (CN)

(73) Assignee: BEIJING XIAOMI MOBILE SOFTWARE CO., LTD., Haidian District ( * ) Notice: Subject to any disclaimer, the term of this patent is extended or adjusted under 35 U.S.C. 154(b) by 0 days.

(21) Appl. No.: 15/652,268

(22) Filed: Jul. 18, 2017

(65) Prior Publication Data

US 2018/0034956 A1 Feb. 1, 2018

(30) Foreign Application Priority Data

Jul. 28, 2016 (CN) .......................... 2016 1 0608625

(51) Int. Cl.

| | |
|---|---|
| ***H04M 3/22*** | (2006.01) |
| ***H04M 3/48*** | (2006.01) |
| ***H04M 3/487*** | (2006.01) |
| ***H04W 8/20*** | (2009.01) |
| ***H04W 4/14*** | (2009.01) |

(52) U.S. Cl.

CPC ........... *H04M 3/2218* (2013.01); *H04M 3/48* (2013.01); *H04M 3/487* (2013.01); *H04W 8/205* (2013.01); *H04M 2203/551* (2013.01); *H04M 2203/651* (2013.01); *H04W 4/14* (2013.01)

(58) Field of Classification Search

CPC ...... H04M 3/2218; H04M 3/48; H04M 3/487; H04W 8/205; H04W 4/14

USPC ............ 379/121.04, 121.05, 207.05, 209.01, 379/210.01, 71, 72; 455/466, 414.1

See application file for complete search history.

(56) References Cited

U.S. PATENT DOCUMENTS

| | | | | |
|---|---|---|---|---|
| 2007/0133771 A1* | 6/2007 | Stifelman | H04M 3/48 | 379/142.01 |
| 2012/0094642 A1* | 4/2012 | Popperl | H04M 3/42076 | 455/415 |
| 2012/0208505 A1* | 8/2012 | Teng | H04M 3/48 | 455/411 |

(Continued)

FOREIGN PATENT DOCUMENTS

| | | |
|---|---|---|
| CN | 1703101 A | 11/2005 |
| CN | 101800802 A | 8/2010 |

(Continued)

OTHER PUBLICATIONS

Extended European Search Report for European application No. 17181864.4, dated Dec. 11, 2017.

(Continued)

*Primary Examiner* — Inder P Mehra

(74) *Attorney, Agent, or Firm* — Jun He Law Offices P.C.; James J. Zhu

(57) ABSTRACT

A method, device and medium for obtaining a call record of a mobile terminal are provided. The method includes: obtaining a missed incoming call record; and inserting the missed incoming call record into call records of the mobile terminal.

20 Claims, 5 Drawing Sheets

After the mobile terminal of the user is restarted, send a record obtaining message to the server to obtain outgoing call records of contacts associated with the user of the mobile terminal, wherein the record obtaining message includes the starting and ending times of the shutdown of the mobile terminal of the user and the telephone number of the mobile terminal — 201

Receive the outgoing call records of the contact sent by the server, wherein the outgoing call records of the contacts include outgoing call records which are between the starting and ending times of the shutdown of the mobile terminal of the user and indicate a called number which is the telephone number of the mobile terminal — 202

Take the outgoing call records of all contacts as the missed incoming call records — 203

Insert the missed incoming call records into the call records of the mobile terminal — 204

Notify the user of new call records — 205

(56) References Cited

U.S. PATENT DOCUMENTS

| | | | | |
|---|---|---|---|---|
| 2013/0005308 | A1* | 1/2013 | Wouterse | H04W 4/16 455/413 |
| 2013/0266130 | A1* | 10/2013 | Lu | H04M 3/436 379/201.02 |
| 2014/0335837 | A1* | 11/2014 | Zhu | H04W 4/16 455/415 |
| 2017/0331946 | A1* | 11/2017 | Mumick | H04M 3/02 |

FOREIGN PATENT DOCUMENTS

| | | | |
|---|---|---|---|
| CN | 101834951 | A | 9/2010 |
| CN | 103281464 | A | 9/2013 |
| KR | 20090097421 | A | 9/2009 |

OTHER PUBLICATIONS

The First Office Action in Chinese application No. 201610608625.5, dated Jul. 3, 2018.

* cited by examiner

METHOD, MEDIUM FOR OBTAINING CALL RECORDS OF MOBILE TERMINAL, AND MOBILE TERMINAL

CROSS-REFERENCE TO RELATED APPLICATIONS

The present application is based upon and claims priority to Chinese Patent Application No. 201610608625.5, filed Jul. 28, 2016, the entire contents of which are incorporated herein by reference.

TECHNICAL FIELD

The present disclosure generally relates to the technical field of smart terminals, and more particularly, to a method and medium for obtaining call records of a mobile terminal, and the mobile terminal.

BACKGROUND

Currently, with the development of smart phones, mobile phones have become an important part in people's life. Phone calls also have become one of the important communication manners for people. Smart phones often run out of power, due to its limited battery capacity. If a mobile phone is running out of power or shut down, the mobile phone cannot receive calls, and thus some important calls may be missed. As a result, a user cannot be inform of in time whether someone has called the user during the shutdown or under other conditions that the phone is not available.

SUMMARY

Embodiments of the present disclosure provide a method, device and medium for obtaining call records of a mobile terminal.

According to a first aspect of embodiments of the present disclosure, there is provided a method for obtaining call records of a mobile terminal. The method includes: obtaining a missed incoming call record of the mobile terminal; and inserting the missed incoming call record into the call records of the mobile terminal.

According to a second aspect of embodiments of the present disclosure, there is provided a mobile terminal, and the mobile terminal includes: a processor; and a memory for storing instructions executable by the processor; wherein the processor is configured to: obtain a missed incoming call record of a mobile terminal; and insert the missed incoming call record into call records of the mobile terminal.

According to a third aspect of the embodiment of the present disclosure, there is provided a non-transitory computer-readable storage medium storing instructions, executable by a processor in a mobile terminal, for performing a method for obtaining call records of a mobile terminal, and the method includes: obtaining a missed incoming call record of the mobile terminal; and inserting the missed incoming call record into the call records of the mobile terminal.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Description will now be made in detail for exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
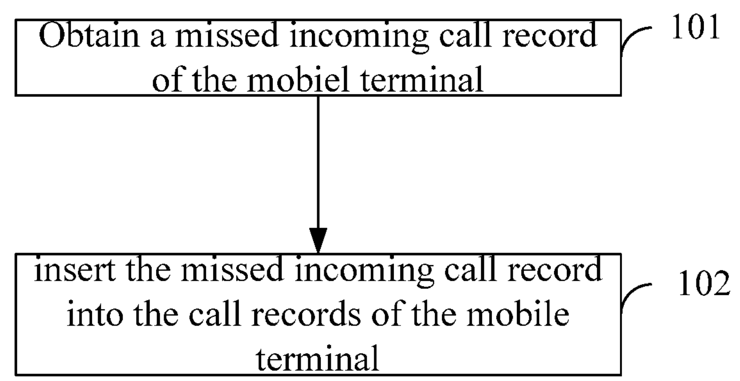
FIG. 1 is a flowchart showing a method for obtaining a call record according to an exemplary embodiment.

FIG. 1 is a flowchart illustrating a method for obtaining a call record according to an exemplary embodiment. As shown in FIG. 1, the method for obtaining a call record is applied in a mobile terminal, and may include the following steps 101 to 102.

In step 101, a missed incoming call record of the mobile terminal is obtained.

In step 102, the missed incoming call record is inserted into call records of the mobile terminal.

Typically, if a user's mobile phone is in a shutdown state, the user cannot be informed of whether there is an incoming call during the shutdown or other conditions that the phone is not available, unless the user uses information of telecom carriers. Also, it's also not feasible to automatically insert incoming-call information into call records of the user's mobile phone. This brings many inconveniences to the user. However, by using the technical solutions of the present disclosure, after the user restarts his/her mobile phone, the mobile phone automatically obtains one or more records about incoming calls during the shutdown or other conditions that the phone is not available, and automatically inserts the obtained records about incoming calls into the existing call records of the mobile phone, thereby bringing conveniences to the user.

In an embodiment, a mobile terminal may automatically obtains one or more missed incoming call records after being connected to a carrier's network. The missed incoming call records can be obtained in many ways. For example, the missed incoming call records can be intelligently obtained according to network connection information of mobile terminals which initiate calls or by parsing contents of short messages. For example, there might be a situation that a calling party may send a short message if a mobile terminal cannot be dialed in: "I have called you just now but you are not available, please call me back after seeing the short message". After receiving such kind of short messages, the called mobile terminal can intelligently identify the semantic contents in the short message by matching the short message with a pre-stored template, and then determine that the called terminal has a missed incoming call record.

In an embodiment, a missed incoming call record refers to a call record which indicates a call initiated by a calling party but is not saved in the mobile terminal of a called party. For example, if a mobile terminal is shut down and a calling party calls the mobile terminal at this time, then the mobile terminal is not available. As another example, if a mobile terminal is at a location where there is no telephone signal, no call can be received by the mobile terminal. Or, because of defects of the Android system, if a mobile terminal receives a call and then it is shut down immediately, the call record cannot be saved.

In an embodiment, one or more missed incoming call records can be obtained from a server. If a calling party calls a mobile terminal of a called party when the mobile terminal is shut down or is not available, the call cannot be received by the mobile terminal, and the call record can be synchronized to call records associated with the mobile terminal on a cloud server. After the mobile terminal is restarted or re-obtains carrier's network signals, the mobile terminal can directly obtain the call record from the cloud server and insert the obtained call record into the call records of the mobile terminal.

In an embodiment, the obtaining of the missed incoming call record from the server may include: obtaining outgoing call records of a calling party from the server; obtaining, from the outgoing call records of the calling party, an outgoing call record which indicates an outgoing call from the calling party to the mobile terminal; and using the outgoing call record which indicates the outgoing call from the calling party to the mobile terminal as the missed incoming call record. For example, a database associated with each network user can be established in the server to synchronously store call records associated with each user. For users each of whom is a contact of another one, they can obtain call records associated with themselves from the call records of their contacts by the authorization of their contacts. For example, when users A and B are contacts of each other, and user B initiates a call to user A while the mobile terminal of user A is shut down. User B fails to reach user A because the mobile terminal of user A is in a shutdown state. At this time, if user B is in a network-connected state, user B can directly synchronize the call record to the server. After the mobile terminal of user A is restarted, the mobile terminal can directly obtain from the server this call record which indicates the call from user B, and insert the obtained call record, as the incoming call record of the mobile terminal itself, into the call records of the mobile terminal.

In an embodiment, one or more missed call records can be obtained from contents of a received short message. In some situations, some carriers may notify users of missed incoming calls using short messages. In some other situations, settings can be performed so that if a calling party calls a mobile terminal but the called terminal is not available, a short message can be sent to the mobile terminal to notify the user of the mobile terminal about the incoming call record.

In an embodiment, the obtaining of the missed incoming call record from the contents of the received short message may include: obtaining contents of the received short message in a predefined format; and obtaining the missed incoming call record from the contents of the short message in the predefined format. In the embodiment, for example, when user B is calling user A, if the terminal of user A is not available because it is in an offline state or in a shutdown state, the terminal of user B can automatically generate and send a short message with contents in a predefined format to user A to notify of the time when user B calls user A. After the mobile terminal of user A is restarted or is on line again, the mobile terminal of user A receives a short message notification in a predefined format which is sent by user B, and obtain the missed incoming call record therefrom. Because the format of the short message is fixed, after the mobile terminal of user A receives the short message in the predefined format, user A can know that the short message is used for notifying the missed incoming call record, and the mobile terminal of user A can obtain the information about the incoming call record from the short message contents by matching the received short message with a predetermined template.

In an embodiment, the obtaining of the missed incoming call record from the contents of the received short message may include: obtaining the missed incoming call record from a short message notification received from a carrier. Some carriers may provide services for notifying users of missed incoming call records using short messages. The format and sender of such kind of short messages are usually fixed, and thus if a mobile terminal receives such kind of short message from the carriers, the mobile terminal can obtain the missed incoming call record by matching the received short messages with a pre-stored template. In some other embodiments, some carriers may provide API, and the records of calls which are missed by users can be obtained using the API.

In an embodiment, one or more missed call records can be obtained directly from a carrier. A mobile terminal can directly obtain and synchronize all call records from the carrier, if there is a cooperation relationship with the carrier, or if the carrier provides such a service. For example, the carrier can record all call records associated with users, including incoming call records missed when mobile terminals of users are in a shutdown state or in an offline state. If the mobile terminals of users are restarted or are on line again, the call records associated with the users can be synchronized to the mobile terminals of the users.

In an embodiment, the obtaining of the missed incoming call record may include one or more of: obtaining the missed incoming call record from a server; obtaining the missed incoming call record from contents of a received short message; and obtaining the missed incoming call record from a carrier. The three manners for obtaining missed incoming call record can be applied in different situations. Obtaining the missed incoming call record from a server is suitable for a situation where both calling and called mobile terminals are being connected to networks. If one of the calling and called mobile terminals is not connected to networks, the second manner can be used, i.e., the missed incoming call record can be obtained from contents of a received short message. For users who can directly obtain call records from a carrier, the third manner can be used, i.e., the missed incoming call record can be obtained from the carrier. In some embodiments, any two or more of the above three manners can be used at the same time, in order to accommodate different situations of the called and calling parties. If any two or more of the three manners are used, the manner having a highest priority can be used according to priority settings. Optionally, three or two manners can be used at the same time and duplicates can be deleted after the call records are obtained.

In an embodiment, the step of inserting the missed incoming call record into call records of the mobile terminal may include: inserting the obtained missed incoming call record into the call records of the mobile terminal according to incoming-call time; and deleting duplicates in the call records of the mobile terminal. After obtaining the missed incoming call record, the mobile terminal of a called party can automatically insert the obtained call record into the call records of the mobile terminal according to the incoming-call time. If the call records are obtained using a plurality of manners, there might be duplicates in the call records, and the duplicates can be deleted after the missed incoming call records are inserted into the call records of the mobile terminal.

In an embodiment, after the missed incoming call record is inserted into call records of the mobile terminal, the method further includes: notifying a user of the missed incoming call record. After automatically inserting the missed incoming call record into call records of the mobile terminal, the mobile terminal can notify the user of the missed incoming call record. For example, a missed call can be shown on a screen of the mobile terminal, and the incoming-call time and the calling party of the missed call can be shown. The user can select to call the calling party or ignore the call record after seeing the notification.

In an embodiment, the above methods can be performed after the mobile terminal of the user is restarted or the state of the mobile terminal is changed from an offline state to an online state. Optionally, the above methods can be performed at a time designated by the user.

The technical solutions of the present disclosure will be described below with reference to specific embodiments.

Figure 2:
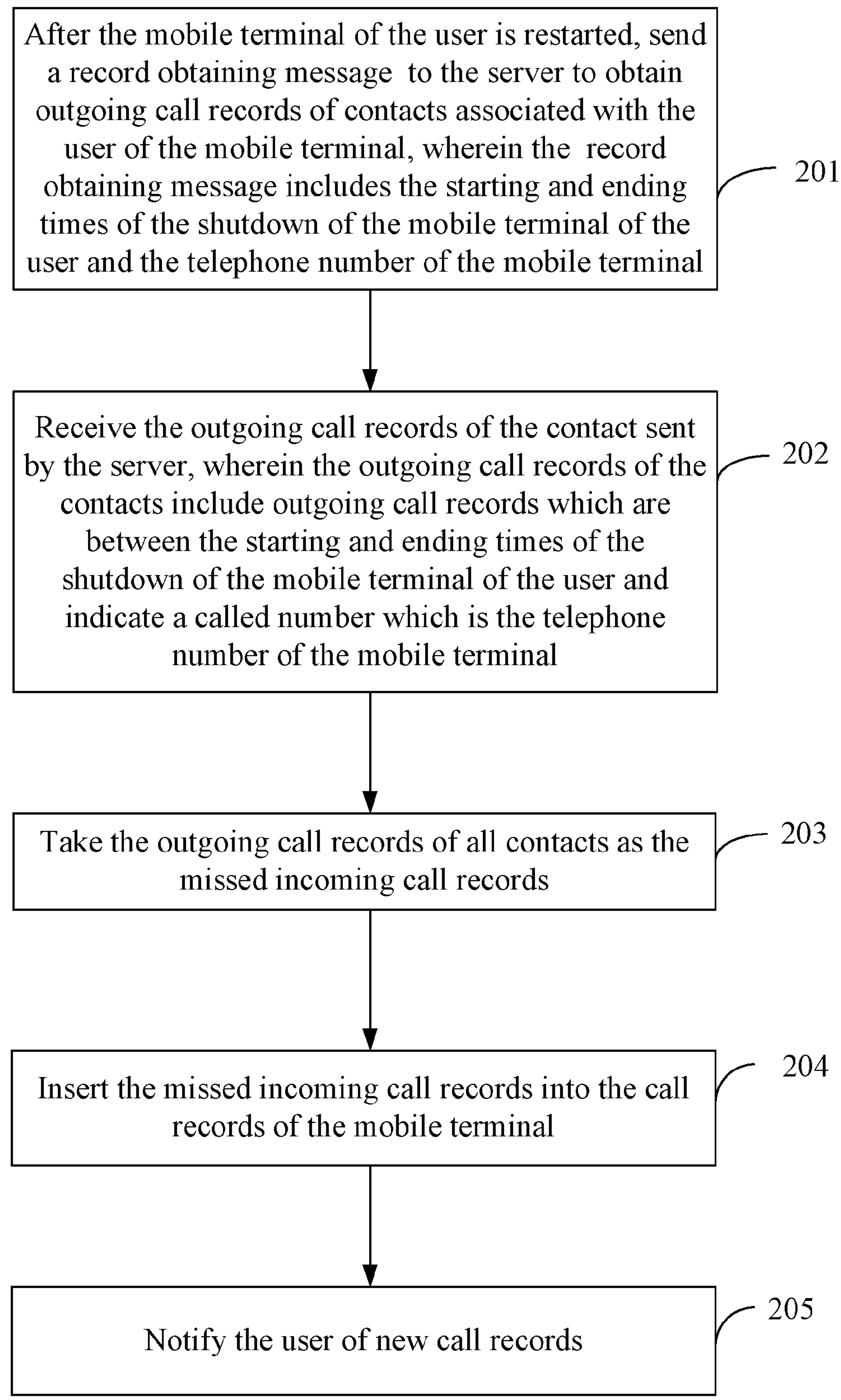
FIG. 2 is a flowchart showing a method for obtaining a call record according to another exemplary embodiment.

In an embodiment, descriptions will be made in detail for an example that the missed incoming call record is obtained from a server. For example, user A calls user B, but user B does not receive the call because his/her mobile terminal is shut down or because of some other reasons. The cloud service used by user A and user B can save call records, and thus the record of the call from user A to user B is saved in the cloud data associated with the user A. The call record which indicates the call from user A to user B but is not successfully saved by the mobile terminal of user B can be obtained from the cloud data and sent to user B, so as to complement the call records of user B. As shown in FIG. 2, the specific flow may be as follows.

In step 201, after the mobile terminal of the user is restarted, a record obtaining message is sent to the server to obtain outgoing call records of contacts associated with the user of the mobile terminal. The record obtaining message includes the starting and ending times of the shutdown of the mobile terminal of the user and the telephone number of the mobile terminal.

In step 202, the outgoing call records of the contacts sent by the server are received. The outgoing call records of the contacts include outgoing call records which are between the starting and ending times of the shutdown of the mobile terminal of the user and indicate a called number which is the telephone number of the mobile terminal.

In step 203, the outgoing call records of the contacts are used as the missed incoming call records.

In step 204, the missed incoming call records are inserted into the call records of the mobile terminal.

In step 205, the mobile terminal may notify the user of new call records.

In the embodiment, after the mobile terminal of the user is restarted, the mobile terminal of the user obtains, from the server, the outgoing call records of contacts associated with the user of the mobile terminal. The outgoing call records include all outgoing call records which indicate a called number which is the telephone number of the mobile terminal during the shutdown of the mobile terminal. After obtaining the outgoing call records, the records are converted as the incoming call records of the mobile terminal, and then the records are inserted into the call records of the mobile terminal. At the same time, the mobile terminal notifies the user of missed calls. The method automatically inserts the missed call records which indicate calls missed during the shutdown into the call records of the mobile terminal and notify the user of the missed calls. Thus, important calls will not be missed, and thereby user experience can be improved.

In another embodiment, description will be made for an example that a contact automatically sends a short message which indicates a missed call to the mobile terminal of a user. For example, China Mobile provides a call reminder service, the cost of which is 3 RMB per month. Using such service, short messages are sent to notify users of missed calls. The "call reminder" service refers to a service provided for a called user to notify the missed calls. If a called user is busy, or the mobile terminal of the called user is shut down or not available, the call from a calling party will be connected to a missed call service system, and according to the identity of the calling party and the selection of the calling party, the call information can be sent to the called party when the terminal of the called party is available. This can ensure that the information of the calls between the calling and called parties will not missed, and thus provide improved user experience. Three major carriers, including China Mobile, China Telecom, and China Unicom, each provides the call reminder service. The service of China Mobile is known as a call reminder service. The service of China Telecom is known as a missed call reminder service. The service of China Unicom is known as a communication assistance service.

Figure 3:
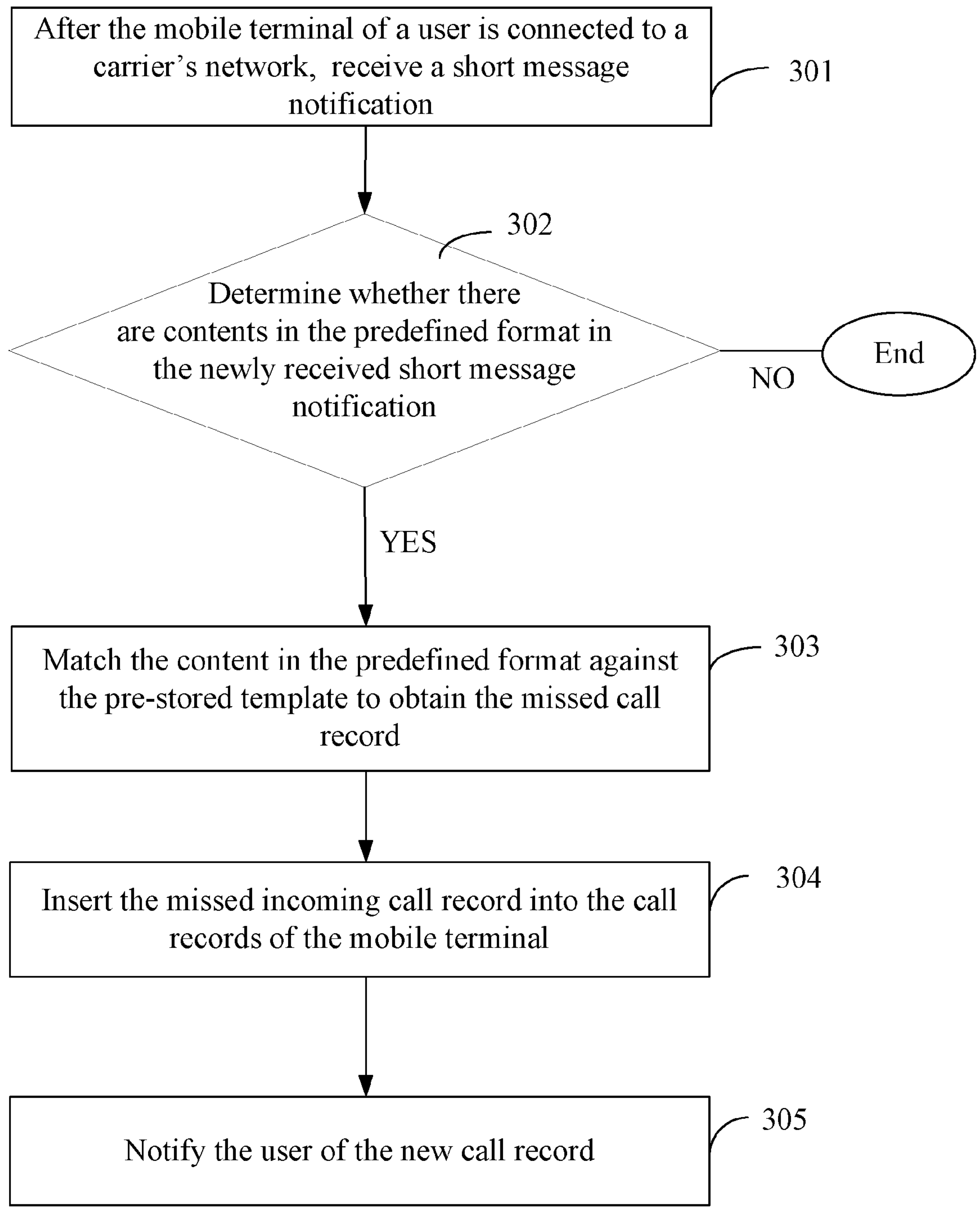
FIG. 3 is a flowchart showing a method for obtaining a call record according to another exemplary embodiment.

The specific flow is shown in FIG. 3.

In step 301, after the mobile terminal of a user is connected to a carrier's network, the mobile terminal can receive a short message notification.

For example, after the user orders the call reminder service of China Mobile, if there is a missed call, the mobile terminal of the user may receive a call reminder short message from China Mobile, the sender number of the short message is "106581210", and the contents of the short message may be: "Shanghai Mobile provides call reminder service for you: telephone number 058107363 called your mobile phone at 13:35, Jul. 22, 2016, please call back in time". For every district of China, the sender number of the call reminder short messages sent by the China Mobile is fixed, and the format of the contents of the short messages is fixed. Therefore, a short message template may be preset based on the fixed format. After a short message is received, the short message is matched with the preset short message template to identify the number of the incoming call.

In step 302, whether there are short message contents in a predefined format in the newly received short message notification is determined. If there are short message contents in the predefined format, step 303 is performed; otherwise, the flow process ends.

In step 303, the short message contents in a predefined format are matched with a pre-stored template to obtain a missed incoming call record.

In step 304, the missed incoming call record is inserted into call records of the mobile terminal.

In step 305, the mobile terminal notifies the user of the new call record.

In the embodiment, after the mobile terminal of the user is connected to the carrier's network again, the mobile terminal of the user can receive new short message notifications. The mobile terminal can identify, from the short messages notifications, a short message for notifying the missed incoming call record, and obtain the missed incoming call record by matching the short message notifications with the pre-stored template. After the missed incoming call record is obtained, the missed incoming call record is inserted into the call records of the mobile terminal, and meanwhile the mobile terminal notifies the user of the missed call. The method automatically inserts the missed incoming call records which indicate calls missed during the shutdown into the call records of the mobile terminal, and then notify the user of the missed calls. Thus, important calls will not be missed, and thereby user experience can be improved.

Embodiments of devices, which are used for performing the methods according to embodiments of the present disclosure, will be described below.

Figure 4:
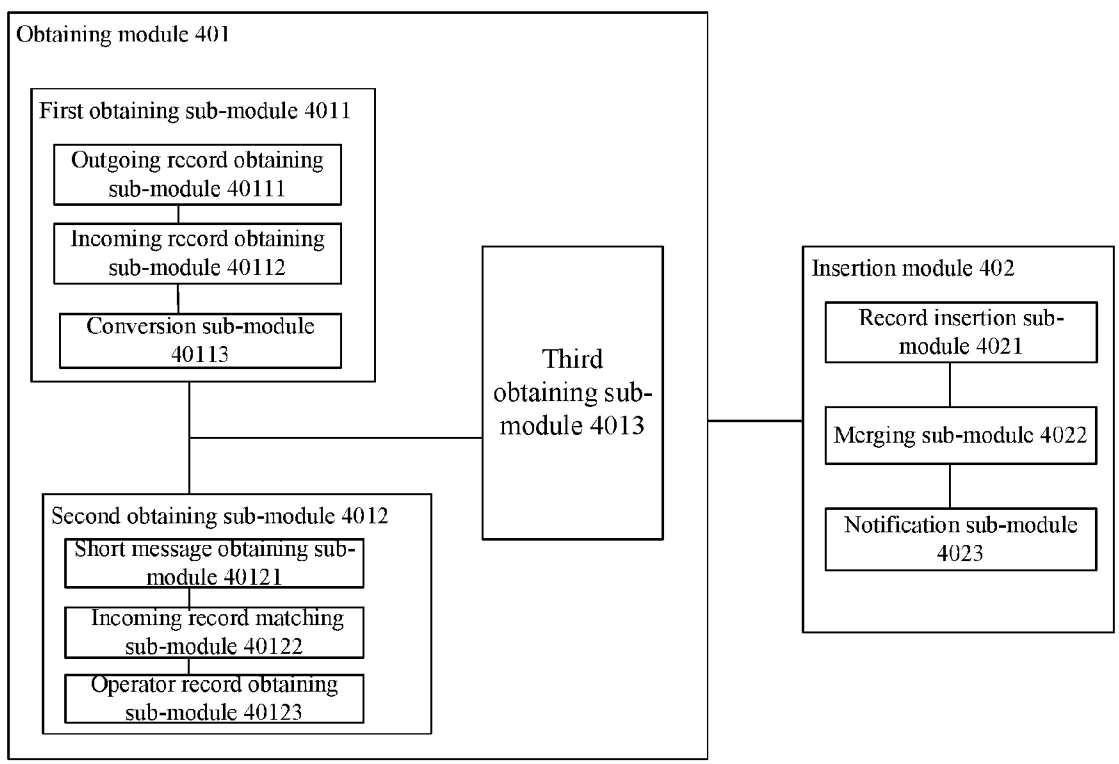
FIG. 4 is a block diagram showing a device for obtaining a call record according to an exemplary embodiment.

FIG. 4 is a block diagram illustrating a device for obtaining a call record according to an exemplary embodiment. The device can be realized as whole or a part of an electronic device by software, hardware or a combination thereof. As shown in FIG. 4, the device for obtaining a call record may include an obtaining module 401 and an insertion module 402.

The obtaining module 401 is configured to obtain a missed incoming call record.

The insertion module 402 is configured to insert the missed incoming call record into call records of the mobile terminal.

The obtaining module 401 may include any one of a first obtaining sub-module 4011, a second obtaining sub-module 4012, and a third obtaining sub-module 4013.

The first obtaining sub-module 4011 is configured to obtain the missed incoming call record from a server.

The second obtaining sub-module 4012 is configured to obtain the missed incoming call record from contents of a received short message.

The third obtaining sub-module 4013 configured to obtain the missed incoming call record from a carrier.

The first obtaining sub-module 4011 may include an outgoing record obtaining sub-module 40111, an incoming record obtaining sub-module 40112 and a conversion sub-module 40113.

The outgoing record obtaining sub-module 40111 is configured to obtain outgoing call records of a calling party from the server.

The incoming record obtaining sub-module 40112 is configured to obtain, from the outgoing call records of the calling party, an outgoing call record which indicates an outgoing call from the calling party to the mobile terminal.

The conversion sub-module 40113 is configured to use the outgoing call record which indicates the outgoing call from the calling party to the mobile terminal as the missed incoming call record.

The second obtaining sub-module 4012 may include a short message obtaining sub-module 40121 and an incoming record matching sub-module 40122.

The short message obtaining sub-module 40121 is configured to obtain contents of the received short message in a predefined format.

The incoming record matching sub-module 40122 is configured to obtain the missed incoming call record from the contents of the short message in the predefined format.

The second obtaining sub-module 4012 may include a carrier record obtaining sub-module 40123.

The carrier record obtaining sub-module 40123 is configured to obtain the missed incoming call record from a short message notification received from a carrier.

The insertion module 402 may include a record insertion sub-module 4021 and a merging sub-module 4022.

The record insertion sub-module 4021 is configured to insert the obtained missed incoming call record into the call records of the mobile terminal according to incoming-call time.

The merging sub-module 4022 is configured to delete duplicates in the call records of the mobile terminal.

The insertion module 402 may further include a notification sub-module 4023.

The notification sub-module **40*s*3** is configured to notify a user of the missed incoming call.

In the embodiment, when a mobile terminal is restarted or the state of the mobile terminal is changed from an offline state to an online state, the obtaining module obtains the missed incoming call record, and the obtained missed incoming call record is automatically inserted into call records of the mobile terminal. This is convenient for users to view records, and can avoid missing of important calls, and thereby improve user experience.

Embodiments of the present disclosure further provide a mobile terminal, including:

a processor; and a memory for storing instructions executable by the processor;

wherein the processor is configured to:

obtain a missed incoming call record; and insert the missed incoming call record into call records of the mobile terminal.

According to an embodiment, the processor is configured to perform any one of:

obtaining the missed incoming call record from a server;

obtaining the missed incoming call record from contents of a received short message; and obtaining the missed incoming call record from a carrier.

According to an embodiment, the processor is configured to:

obtain outgoing call records of a calling party from the server;

obtain, from the outgoing call records of the calling party, an outgoing call record which indicates an outgoing call from the calling party to the mobile terminal; and use the outgoing call record which indicates the outgoing call from the calling party to the mobile terminal as the missed incoming call record.

According to an embodiment, the processor is configured to:

obtain contents of the received short message in a predefined format; and obtain the missed incoming call record from the contents of the short message in the predefined format.

According to an embodiment, the processor is configured to:

obtain the missed incoming call record from a short message notification received from a carrier.

According to an embodiment, the processor is configured to:

insert the obtained missed incoming call record into the call records of the mobile terminal according to incoming-call time; and delete duplicates in the call records of the mobile terminal.

According to an embodiment, the processor is configured to:

after the missed incoming call record is inserted into the call records of the mobile terminal, notify a user of the missed incoming call record.

With respect to the devices in the above embodiments, the specific manners for performing operations for individual modules therein have been described in detail in the embodiments regarding the methods, which will not be elaborated herein.

Figure 5:
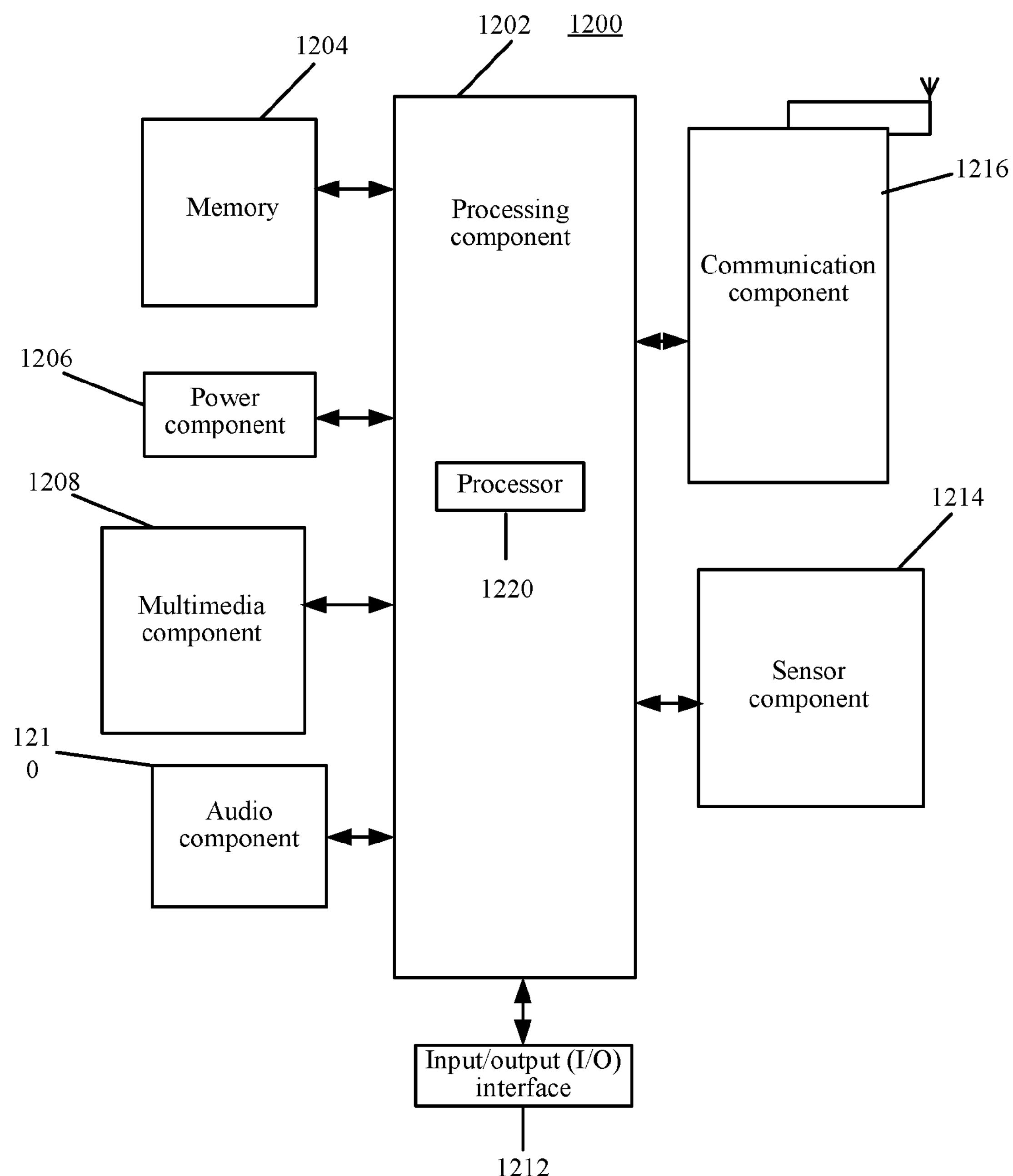
FIG. 5 is a block diagram for a device for obtaining a call record according to an exemplary embodiment.

FIG. 5 is a block diagram illustrating a device 1200 for obtaining a call record according to an exemplary embodiment. The device 1200 may be applied in a terminal device. For example, the device 1200 may be a mobile phone, a computer, a digital broadcast terminal, a messaging transceiver, a gaming console, a tablet device, a medical device, exercise equipment, a personal digital assistant, and the like.

The device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, whether wired or wireless, between the device 1200 and other devices. The device 1200 can access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1204, executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

There is provided a non-transitory computer-readable storage medium, when instructions in the storage medium are executed by the processor in the above device 1200, the device 1200 is caused to perform a method for obtaining a call record, applied in a mobile terminal, including:

obtaining a missed incoming call record; and inserting the missed incoming call record into call records of the mobile terminal.

According to an embodiment, the step of obtaining the missed incoming call record includes any one of:

obtaining the missed incoming call record from a server;

obtaining the missed incoming call record from contents of a received short message; and obtaining the missed incoming call record from a carrier.

According to an embodiment, the step of obtaining the missed incoming call record from the server includes:

obtaining outgoing call records of a calling party from the server;

obtaining, from the outgoing call records of the calling party, an outgoing call record which indicates an outgoing call from the calling party to the mobile terminal; and using the outgoing call record which indicates the outgoing call from the calling party to the mobile terminal as the missed call record.

According to an embodiment, the step of obtaining the missed incoming call record from the contents of the received short message, includes:

obtaining contents of the received short message in a predefined format; and obtaining the missed call record from the contents of the short message in the predefined format.

According to an embodiment, the step of obtaining the missed incoming call record from the contents of the received short message, includes:

obtaining the missed incoming call record from a short message notification received from a carrier.

According to an embodiment, the step of inserting the missed incoming call record into call records of the mobile terminal, includes:

inserting the obtained missed incoming call record into the call records of the mobile terminal according to incoming-call time; and deleting duplicates in the call records of the mobile terminal.

According to an embodiment, after the missed incoming call record is inserted into call records of the mobile terminal, the method further includes:

notifying a user of the missed incoming call record.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for obtaining call records of a mobile terminal that are missed during the mobile terminal is offline or shutdown, the method comprising:

sending, after the mobile terminal is recovered from offline or shutdown, a record obtaining message to a server, the record obtaining message comprising a starting time and an ending time of the offline or shutdown of the mobile terminal and a telephone number of the mobile terminal;

obtaining, according to the record obtaining message, one or more outgoing call records of contacts associated with the telephone number of the mobile terminal from the server;

obtaining, from the outgoing call records of the contacts, a missed incoming call record of the mobile terminal; and inserting the missed incoming call record into call records of the mobile terminal according to a call time of the missed incoming call.

2. The method according to claim 1, wherein the obtaining the missed incoming call record further comprises obtaining the missed incoming call record from contents of a received short message, or a carrier.

3. The method according to claim 2, wherein the obtaining the missed incoming call record from the server comprises:

obtaining outgoing call records of a calling party from the server, the contacts being a calling party making calls during the mobile terminal is offline or shutdown;

obtaining, from the outgoing call records of the calling party, an outgoing call record from the calling party to the mobile terminal; and using the outgoing call record as the missed incoming call record.

4. The method according to claim 2, wherein obtaining the missed incoming call record from the contents of the received short message comprises:

obtaining contents of the received short message in a predefined format; and obtaining the missed incoming call record from the contents of the short message in the predefined format.

5. The method according to claim 2, wherein obtaining the missed call record from the contents of the received short message, comprises:

obtaining the missed incoming call record from a short message notification received from a carrier.

6. The method according to claim 1, wherein inserting the missed incoming call record into the call records of the mobile terminal comprises:

deleting duplicates in the call records of the mobile terminal.

7. The method according to claim 1, wherein after the missed incoming call record is inserted into call records of the mobile terminal, the method further comprises:

notifying a user of the missed incoming call record.

8. A mobile terminal for obtaining call records that are missed during the mobile terminal is offline or shutdown, comprising:

a processor; and a memory for storing instructions executable by the processor;

wherein the processor is configured to:

send, after the mobile terminal is recovered from offline or shutdown, a record obtaining message to a server, the record obtaining message comprising a starting time and an ending time of the offline or shutdown of the mobile terminal and a telephone number of the mobile terminal;

obtain, according to the record obtaining message, one or more outgoing call records of contacts associated with the telephone number of the mobile terminal from the server;

obtain, from the outgoing call records of the contacts, a missed incoming call record of the mobile terminal; and insert the missed incoming call record into call records of the mobile terminal according to a call time of the missed incoming call.

9. The mobile terminal according to claim 8, wherein the processor configured to obtain the missed incoming call record is further configured to obtain the missed incoming call record from contents of a received short message, or a carrier.

10. The mobile terminal according to claim 9, wherein the processor configured to obtain the missed incoming call record from the server is further configured to:

obtain outgoing call records of a calling party from the server, the contacts being a calling party making calls during the mobile terminal is offline or shutdown;

obtain, from the outgoing call records of the calling party, an outgoing call record from the calling party to the mobile terminal; and use the outgoing call record as the missed incoming call record.

11. The mobile terminal according to claim 9, wherein the processor configured to obtain the missed incoming call record from the contents of the received short message is further configured to:

obtain contents of the received short message in a predefined format; and obtain the missed incoming call record from the contents of the short message in the predefined format.

12. The mobile terminal according to claim 9, wherein the processor configured to obtain the missed incoming call record from the carrier is configured to:

obtain the missed incoming call record from a short message notification received from the carrier.

13. The mobile terminal according to claim 8, wherein the processor configured to insert the missed incoming call record into call records of the mobile terminal is further configured to:

delete duplicates in the call records of the mobile terminal.

14. The mobile terminal according to claim 8, wherein after the missed incoming call record is inserted into the call records of the mobile terminal, the processor is configured to:

notify a user of the missed incoming call record.

15. A non-transitory computer-readable storage medium having stored therein instructions that, when executed by a processor of a mobile terminal, causes the mobile terminal to perform a method for obtaining call records of the mobile terminal that are missed during the mobile terminal is offline or shutdown, the method comprising:

sending, after the mobile terminal is recovered from offline or shutdown, a record obtaining message to a server, the record obtaining message comprising a starting time and an ending time of the offline or shutdown of the mobile terminal and a telephone number of the mobile terminal;

obtaining, according to the record obtaining message, one or more outgoing call records of contacts associated with the telephone number of the mobile terminal from the server;

obtaining, from the outgoing call records of the contacts, a missed incoming call record of the mobile terminal; and inserting the missed incoming call record into the call records of the mobile terminal according to a call time of the missed incoming call.

16. The non-transitory computer-readable storage medium according to claim 15, wherein the obtaining the missed incoming call record further comprises obtaining the missed incoming call record from contents of a received short message, or a carrier.

17. The non-transitory computer-readable storage medium according to claim 16, wherein the obtaining the missed incoming call record from the server comprises:

obtaining outgoing call records of a calling party from the server, the contacts being a calling party making calls during the mobile terminal is offline or shutdown;

obtaining, from the outgoing call records of the calling party, an outgoing call record from the calling party to the mobile terminal; and using the outgoing call record as the missed incoming call record.

18. The non-transitory computer-readable storage medium according to claim 16, wherein obtaining the missed incoming call record from the contents of the received short message comprises:

obtaining contents of the received short message in a predefined format; and obtaining the missed incoming call record from the contents of the short message in the predefined format.

19. The non-transitory computer-readable storage medium according to claim 16, wherein obtaining the missed call record from the contents of the received short message, comprises:

obtaining the missed incoming call record from a short message notification received from a carrier.

20. The non-transitory computer-readable storage medium according to claim 15, wherein inserting the missed incoming call record into the call records of the mobile terminal comprises:

deleting duplicates in the call records of the mobile terminal.

* * * * *